(12) United States Patent
Schneider

(10) Patent No.: US 6,201,829 B1
(45) Date of Patent: Mar. 13, 2001

(54) SERIAL/PARALLEL GHZ TRANSCEIVER WITH PSEUDO-RANDOM BUILT IN SELF TEST PATTERN GENERATOR

(75) Inventor: Thomas R. Schneider, Anaheim, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/055,197

(22) Filed: Apr. 3, 1998

(51) Int. Cl.[7] ................................. H04B 1/38; H04L 5/16
(52) U.S. Cl. ..................... 375/221; 375/224; 714/739; 708/252
(58) Field of Search ........................ 375/219, 224, 375/225, 221; 714/733, 738, 739; 708/250, 252

(56) References Cited

U.S. PATENT DOCUMENTS

| | | | |
|---|---|---|---|
| 5,574,733 | * 11/1996 | Kim ........................................ | 714/728 |
| 5,758,104 | * 5/1998 | Gujral et al. ........................ | 710/107 |
| 5,787,114 | * 7/1998 | Ramamurthy et al. ............. | 375/221 |
| 5,907,566 | * 5/1999 | Benson et al. ...................... | 714/798 |

* cited by examiner

Primary Examiner—Chi Pham
Assistant Examiner—Phuong Phu
(74) Attorney, Agent, or Firm—Martine, Penilla & Kim, LLP

(57) ABSTRACT

A pseudo-random built in self test pattern generator is constructed of eight sequential D-flip flops and configured to output 10-bit wide pattern data which conforms to the 8B/10B transmission protocol. The first and fifth D-flip flops of the array have their outputs split, with one leg of the split directly defining a character bit and the other leg of the split defining an inverted character bit. The outputs of the first, second, seventh and eighth D-flip flops are directed to a four input EXOR gate whose output is connected to the D input of the first D-flip flop of the array. Configured as a recirculating feed back loop, the pattern generator defines a sequence of 10-bit patterns in which no more than five sequential 1s or five sequential 0s are generated either within a pattern or on pattern boundaries. The pattern generator provides 255 Fiber Channel-type transmission characters to a Fiber Channel-type transceiver circuit which serializes the characters into a 1.06 GHz serial datastream and then deserializes the datastream into 10-bit transmission characters. The received transmission characters are analyzed and if they match with patterns transmitted, the transceiver circuit is deemed to be correctly operating at a 1.06 GHz characteristic frequency.

17 Claims, 3 Drawing Sheets

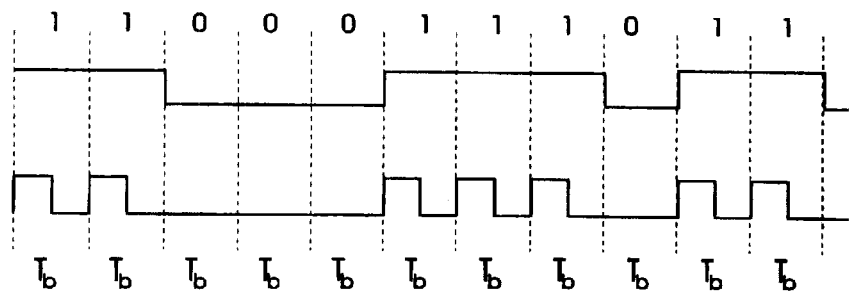
FIG. 1
*(Prior Art)*
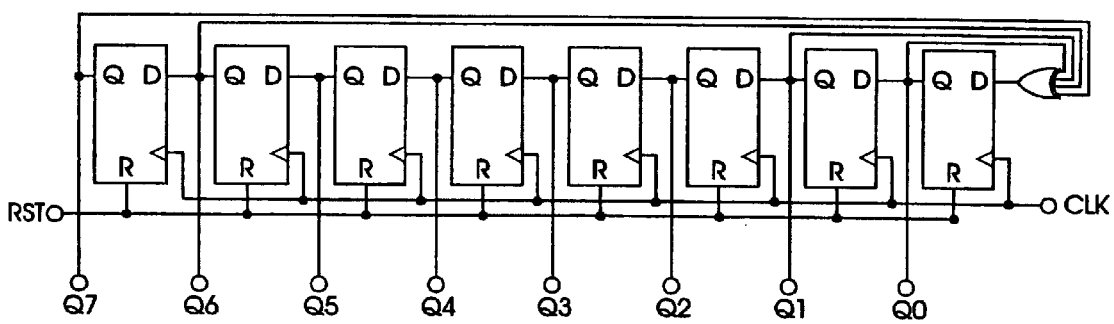
FIG. 2
*(Prior Art)*
| Time | BIST Pattern (msb ... lsb) |
|---|---|
| CLK0 (Init) | 1 1 1 1 1 1 1 1 |
| CLK1 | 1 1 1 1 1 1 1 0 |
| CLK2 | 1 1 1 1 1 1 0 1 |
| CLK3 | 1 1 1 1 1 0 1 1 |
| CLK4 | 1 1 1 1 0 1 1 0 |
| CLK5 | 1 1 1 0 1 1 0 1 |
| CLK6 | 1 1 0 1 1 0 1 1 |
| CLKxxx | (etc) ....... |
FIG. 3
*(Prior Art)*

| Time | BIST Pattern (msb...lsb) |
|---|---|
| CLK0 (init) | 1111011110 |
| CLK1 | 1111011101 |
| CLK2 | 1111011010 |
| CLK3 | 1111010110 |
| CLK4 | 1111001101 |
| CLK5 | 1110111010 |
| CLK6 | 1101010110 |
| CLKxx | (etc) ......... |

SERIAL/PARALLEL GHZ TRANSCEIVER WITH PSEUDO-RANDOM BUILT IN SELF TEST PATTERN GENERATOR

FIELD OF THE INVENTION

The present invention is directed to high speed data transmission and conversion systems and, more particularly, to a system and method for self-testing a GHz transceiver operating at speed to ensure appropriate functional operation of the transceiver in accordance with fibre channel encoded data patterns.

BACKGROUND OF THE INVENTION

The past few years have seen a dramatic increase in the speed of data transmission capabilities among and between the various components of a computer system or between multiple computer systems connected together in a network configuration. Indeed, since the general acceptance of personal computer systems in the 1960's, data transmission speeds have grown with an almost power law dependence; about 1 MHz in the '60's, 10 MHz in the '70's, 100 MHz in the '80's and 1 GHz speeds being routinely achieved in the '90's.

The development of optical fibre for transmission of digital data streams has become a particular enabling technology for modern-day 1 GHz data transmission speeds and, in the computer industry, has given rise to a data transfer protocol and interface system termed Fibre-Channel. Fibre-Channel technology involves coupling various computer systems together with optical fibre or a fibre channel compatible electrically conductive (copper) cable and allows extremely rapid data transmission speeds between machines separated by relatively great distances.

However, because of the physical characteristics of Fibre-Channel-type cable, present day systems are only capable of serial-fashion data transmission (at least when only a single optical fibre or electrical cable is used to interconnect various computer systems). In contrast, computer systems are internally configured to almost universally handle data in parallel fashion on byte-multiple signal busses (8-bit, 16-bit or 32-bit buses), making it incumbent on any data transmission system to provide some means for converting a 1 GHz serial data stream into a byte or byte-multiple parallel data stream. Conversely, since the Fibre-Channel protocol contemplates two-way data transmission, computer systems that typically operate with parallel data structures must have some means for serializing a byte or byte-multiple data stream into a 1 GHz data signal suitable for serial transmission down an optical fibre or an electrically conductive (copper) cable.

Parallel data is typically synchronously serialized for high speed transmission, i.e., the sequence of 1's and 0's making up the resulting serial data stream occurs with reference to a synchronized, uniform, single-frequency serializer clock signal. Encoding and transmitting the clock signal, together with data, would necessarily require an inordinate amount of valuable serial bandwidth and reduce the overall data transmission speed of a Fibre-Channel system. Even though some small degree of self-clocking is inherent in the serial data stream, some method of evaluating the data stream must be used in order that a transceiver or serial-to-parallel data recovery system may determine how to appropriately frame the serial data stream into bytes.

In accordance with the Fibre-Channel physical and signaling interface specification, defined in ANSI X3.230-1994, information to be transmitted over a fibre wire or cable is encoded, 8 bits at a time, into a 10-bit Transmission Character which is subsequently serially transmitted by bit. Data provided over a typical computer system's parallel architecture is encoded and framed such that each data byte (8-bits from the point of view of the computer system) is formed into a Transmission Character in accordance with the Fibre-Channel 8B/10B transmission code. The resulting 8B/10B character is then transmitted as 10 sequential bits at a 1.06 GHz data rate in accordance with the interface specification. Likewise, an incoming 8B/10B encoded transmission character must be serially received at a 1.06 GHz data rate and converted (framed) into the corresponding 10-bit transmission character. The 10-bit transmission character is then further decoded into an 8-bit byte recognizable by conventional computer architectures.

Pertinent to the 8B/10B transmission coding scheme is the fact that the number of sequential 1's and 0's in the resultant serial data stream is arbitrarily limited. In accordance with the Fibre-Channel physical and signaling interface specification, there may be no more than five sequential 1's and 0's in the serial data stream. It is important to realize that this limitation is applicable to the serial data stream as a whole and not to just a transmission character. A first transmission character comprising 1110001111 and a second transmission character comprising 1111001111 would violate the 8B/10B code limitation.

The reason for this limitation becomes evident when it is realized that the serial binary data stream is commonly transmitted in a "nonreturn-to-zero" (NRZ) format as illustrated in the exemplary waveform diagram of FIG. 1. As illustrated in the diagram, NRZ data is distinguished from "return-to-zero" (RZ) data in which the signal returns to a zero value between consecutive bits. In the NRZ case, each bit is defined by a "bit period", indicated in FIG. 1 as $P_b$, and is statistically independent of any of the other bits. Fibre-Channel serial data is transmitted in an NRZ format because, for a given bit rate, NRZ data defines fewer transitions than RZ data making NRZ data preferable for transmission where channel or circuit bandwidth is costly. However, NRZ data comprises a particular attribute that makes the task of clock recovery difficult. Because of the relative absence of transition boundaries, NRZ data may exhibit long sequences of consecutive 1's or 0's, undifferentiated by a bit period marker, thus requiring a clock recovery circuit to "remember" the bit rate during such a sequential period. This means that in the absence of data transitions, the clock recovery circuit should not only continue to produce the clock but also incur negligible drift of the clock frequency. In order to minimize clock recovery circuit drift, the Fibre-Channel serial data stream is arbitrarily limited to five sequential bit periods comprising 1's and five sequential bit periods comprising 0's.

The most common clock recovery circuit is a phase-lock loop, which generates or regenerates asynchronous timing reference signal from a serial data stream and provides a timing reference to a data synchronizer or deserializer in order to mark in time the anticipated occurrence of a serial data bit. In effect, a phase-lock loop generates a synchronous stream of successive timing references, each timing reference representing, for example, a bit period $T_b$ with which a data bit may be associated. The phase-lock loop clock recovery circuit, accordingly, is an essential component in modern day GHz transceiver systems.

The frequency of clock signals recovered by, for example, a receiver phase-lock loop, is subject to a number of variations introduced by the electronic components of such systems. Typically, the electronic components in the data path introduce some elements of phase and frequency noise which are random in nature, and, more particularly, have dramatically varying bandwidth characteristics depending on the geometric and electronic variations in modern semiconductor manufacturing process parameters. Phase-lock loops such as comprises a 1.06 GHz to 106 MHz transceiver, must take these variations into account when attempting to deal with a 1.06 GHz serial data stream. Implementations of a 1.06 GHz to 106 MHz transceiver, including suitable phase-lock loop circuitry are described in co-pending U.S. Pat. applications Ser. Nos. 08/920,524, 08/924,009 and 08/924,028, all filed on Aug. 29, 1997 and commonly owned by the Assignee of the present invention, the entire disclosures of which are expressly incorporated herein by reference.

A particular feature of phase-lock loop system used in conjunction with a GHz serial data receiver is that such phase-lock loop systems may lose frequency or velocity lock in the event that the semiconductor manufacturing process used to implement the transceiver circuit causes the electronic characteristics of the PLL to inordinately drift such that the system exhibits a frequency deviation greater than the "lock range". The lock range is necessarily dependent on the bandwidth of the phase lock loop system but is commonly expressed as either a percentage of the mean frequency or some fixed value about the mean frequency. Since the operational frequency of a PLL corresponds to the VCO control voltage, in a fashion well understood by those having skill in the art, and since the VCO control voltage is, in turn, informed by the various semiconductor manufacturing process tolerances, it is easy to understand how semiconductor manufacturing tolerance drift is able to skew the operational frequency range of a phase-lock loop (PLL).

In order to determine whether a particular transceiver is functional with regard to operation at speed (1.06 GHz), it is necessary to exercise the transceiver circuit under operating conditions. Such an exercise is typically performed on a purpose-built semiconductor test apparatus which toggles the inputs of an integrated circuit in accordance with a pre-determined pattern and examines the pattern developed by the circuit output for conformance to a particular expected data pattern, or output mask. If the circuit's output pattern matches the expected data or mask pattern, the circuit is deemed to have "passed" meaning it is operational within its design performance parameters.

However, integrated circuit architectures are continually pushing the speed envelope, such that their inherent speed capabilities are almost always beyond the testing speed capabilities of integrated circuit testing apparatus. In the Fibre-Channel case, integrated circuit test apparatus are incapable of operationally exercising a 1.06 GHz integrated circuit at its operational data rate. Moreover, the large majority of integrated circuit test apparatus are incapable of exercising the 10-bit character bus at the required 106 MHz rate. Thus, some means must be implemented in the high-speed circuit itself to provide a measure of self-test capability such that the performance of the circuit may be evaluated at its operational 1.06 GHZ speed.

Previous high-speed integrated circuit designs have incorporated some means of internally generating test patterns useful for a built in self test (BIST) function, but prior-art integrated circuit data paths have typically been 8-bits wide and comprised no restriction to the number of sequential 1's or 0's generated by the pattern generator.

Pertinent prior art-type pattern generators suitably comprised an 8-bit linear feedback shift register (LFSR) which was able to pseudo-randomly generate a set of 255 patterns (out of a total of 256) at a data rate determined by a clock signal derived within the high-speed integrated circuit.

A typical prior art-type built in self test pattern generator using a linear feedback shift register is depicted in semi-schematic block diagram form in FIG. 2. In FIG. 2, the linear feedback shift register (LFSR) is implemented as eight sequential D-flip flops, each having a D input, a Q output, a clock (CLK) input and a set (SET) input. All of the clock inputs are tied to a clock signal CLK which is defined by the integrated circuit at issue and has a frequency equal to the operational speed of the chip. Each of the Q outputs of each of the D-flip flops are taken off to define an 8-bit wide bus with the righthand most Q output representing the least significant bit (LSB) and the left hand most Q output representing the most significant bit (MSB). The Q output of the LSB flip flop is directed to the input of the next-most significant bit D flip flop. Its Q output is, in turn, directed to the next-most significant flip flop, and so on down the string to the MSB flip flop. The output of the MSB flip flop is fed-back to the D input of the LSB flip flop through a 4-input exclusive OR (EXOR) gate. The other three inputs of the EXOR gate are taken from the Q outputs of the LSB flip flop, the next-most significant flip flop and the most significant-but-one flip flop.

The pattern result of such a configuration is depicted in the BIST pattern table of FIG. 3. At CLK time =0 (initialization) all of the D-flip flops are initialized to output 1's by strobing the SET inputs. As CLK toggles, the LFSR begins operation to generate the patterns depicted in the table of FIG. 3.

While able to shift data at high-speed rates, the LFSR of the prior art is unable to generate the unique patterns required for conformance to the Fibre-Channel 8B/10B transmission code. While the Fibre-Channel 8B/10B transmission code supports all 256 8-bit combinations, these combinations are expressed in 10-bit Transmission Characters. The Transmission Characters, themselves, are characterized by particular bit structure implementations such that, even for sequential Transmission Characters, no more than five sequential 1's and 0's may appear in the resulting serial data stream.

Accordingly, there is a demonstrated need for a built in self test system which operates in accordance with the frequency characteristics of a particular integrated circuit and is able to generate at least 255 out of 256 patterns representing valid transmission characters in accordance with 8B/10B encoding. Such a built in self test feature should be able to be easily implemented in a Fibre-Channel integrated circuit transceiver operating in accordance with a 1.06 GHz clock.

SUMMARY OF THE INVENTION

There is provided in accordance with one aspect of the present invention, a transceiver circuit of the type adapted to interface between high-speed serial data having a 1.06 GHz data rate and parallel-type encoded transmission character bytes in accordance with the Fibre Channel interface specification. The transceiver circuit includes transmit and receive sections, each characterized by and operatively responsive to a phase lock loop. The transmitter section receives and serialized encoded transmission character bytes into a serial datastream while the receiver section receives and deserializes a serial datastream into encoded transmission character bytes.

The transceiver circuit includes a built-in self test pattern generator circuit which defines 10-bit wide parallel data patterns in accordance with the Fibre Channel 8B/10B transmission protocol. The pattern generator is coupled to the input of the transceiver section through a multiplexer which adaptively selects the pattern generator patterns for transmission when the transceiver circuit is placed into self-test mode. The transmitter section serializes the 10-bit wide parallel data patterns into a serial data stream having a 1.06 GHz data rate. The serial data output of the transmitter section is directed in feed-back fashion to an input multiplexer of the receiver section. The receiver section receives the serial datastream, deserializes and byte syncs the serial datastream into 10-bit wide parallel characters. The 10-bit wide parallel characters are sampled by a signature analyzer circuit which analyzes and compares the last-received 10-bit wide character to the last-transmitted 10-bit wide data pattern. If the byte characteristics match, the signature analyzer asserts a match indicator signal, indicating that the transceiver circuit is operating correctly at its nominal 1.06 GHz operating frequency.

In one particular aspect of the invention, the built-in self test pattern generator is configured as a linear feedback shift register comprising 8 D-flip flops connected together serially and operatively responsive to a reference clock signal having a frequency of about 106 MHz. Each of the Q outputs of the eight D-flip flops define particular bits of a 10-bit wide parallel data character. The Q output of the first D-flip flop of the register directly defines the second bit of the 10-bit character and further defines the first bit of the 10-bit character by directing the Q output signal through an invertor element. The Q output of the fifth D-flip flop of the register directly defines the seventh bit of the 10-bit character and further defines the sixth bit of the 10-bit character by directing the Q output through an additional invertor element. The first (LSB) and second bits are thus, always in opposite logical states as are the sixth and seventh bits of the 10-bit parallel data character. The Q outputs of the first, second, seventh and eighth D-flip flops of the register are additionally directed to a four input EXOR gate, whose output is coupled to the D input of the first D-flip flop of the register. The EXOR gate and the invertor elements defining the first and sixth bits of the data character functioning in combination to ensure that no more five sequential 1s or five sequential 0s will be generated by the linear feedback shift register, either within any pattern or at pattern boundaries between sequential patterns.

The linear feedback shift register, thus configured, is initially reset to define a first pattern comprising "1111011110" and further operates in operative response to the reference clock signal to define 255 unique patterns, each pattern comprising a valid Fibre Channel-type transmission character and formatted in accordance with the 8B/10B Fibre Channel transmission protocol.

At the 255th reference clock signal transition, the 10-bit character defined by the linear feedback shift register comprises a bit pattern of "0111011110". The next reference clock signal transition will return the linear feedback shift register to its initial bit pattern state. At the 255th reference clock signal transition, the pattern generator circuit is removed from the transmitter section data path, allowing the final character pattern to be serialized, transmitted to the receiver section, deserialized and synchronized, and provided to the signature analyzer circuit for pattern match. The signature analyzer circuit evaluates the last received 10-bit wide character to determine if its bit pattern comprises: "0111011110". If so, the signature analyzer returns a match indication signal, indicating that the transceiver circuit is able to serialize and deserialize 10-bit wide transmission character information at its nominal 1.06 GHz operational frequency.

The particular configuration of the linear feedback shift register which generates pattern data conforming to the 8B/10B Fibre Channel transmission protocol, allows the transceiver circuit to operate in feed-back self-test mode on true analogs of actual transmission character data. The pattern generator and signature analyzer circuit may thus be merely included in the data path while the remaining processing circuitry is unchanged.

BRIEF DESCRIPTION OF THE DRAWINGS

These and other features, aspects and advantages of the present invention will be more fully understood when considered with respect to the following detailed description, appended claims and accompanying drawings, wherein:

FIG. 1 is an exemplary simplified waveform diagram depicting return-to-zero data and nonreturn-to-zero data;

FIG. 2 is a semi-schematic, simplified block diagram of a prior art-type built in self test pattern generator including a linear feedback shift register;

FIG. 3 is a table depicting bit patterns generated by the linear feedback shift register of FIG. 2 during sequential clock transitions;

DETAILED DESCRIPTION OF THE PREFERRED EMBODIMENT

Figure 4:
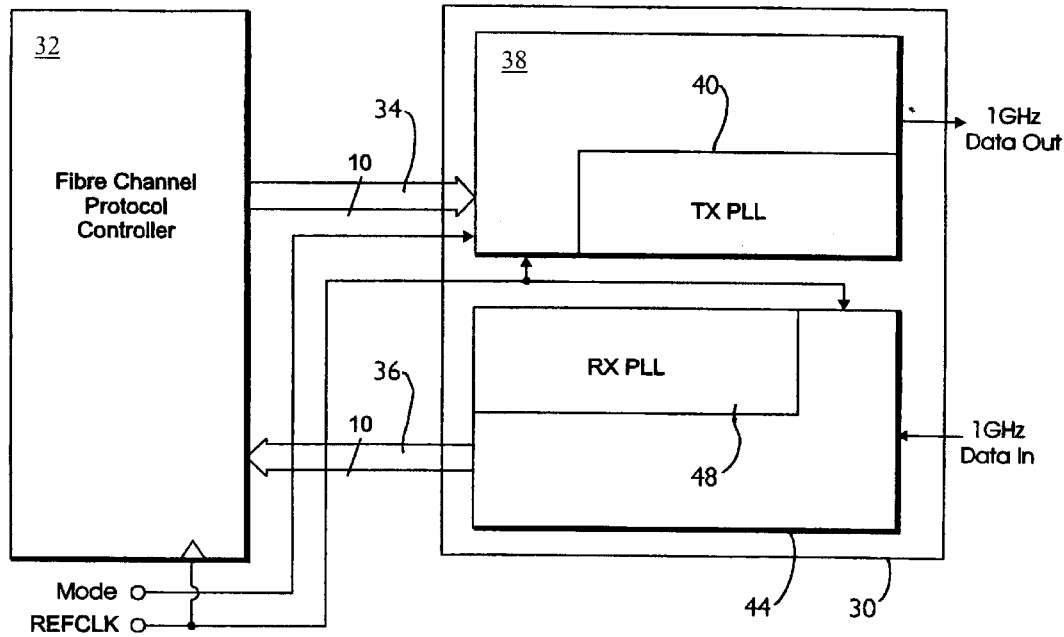
FIG. 4 is a semi-schematic, simplified block diagram of a typical Fibre Channel application comprising a protocol device coupled to a transceiver including separate transmitter and receiver sections.

Prior to describing one embodiment of the pseudo-random built in self test pattern generator of the present invention, it will be useful to have an understanding of the application of such a circuit in the context of a Fibre Channel-type high speed interface device. Referring now to FIG. 4, a transceiver circuit 30 is configured to communicate with a, for example, Fibre Channel protocol device 32 which communicates 10-bit transmission characters to and from the transceiver 30 over 10-bit wide parallel data buses; a transmitter bus 34 and receiver bus 36. The transmitter and receiver buses, 34 and 36 respectively, function to communicate 8B/10B encoded transmission characters as TTL data, between the protocol device 32 and the transceiver 30. The transceiver 30 comprises a transmitter section 38 which accepts 10-bit wide parallel TTL data from the transmitter bus 34 and serializes the 10-bit transmission character into a high speed serial datastream operating at a 1.0625 GHz data rate. The TTL parallel data is expected to be 8B/10B encoded data, or equivalent, and is latched into an input register of the transmitter section on the rising edge of a 106.25 MHz signal termed reference clock or REFCLK. REFCLK is an externally provided signal, generated by a conventional clock circuit and is further provided to the protocol device 32 for use as a transmit byte clock signal.

A transmitter phase lock loop 40 locked to the externally supplied 106.25 MHz reference clock signal which is then multiplied by 10, in order to generate the 1.0625 GHz serial signal clock defining the data rate of the high speed output. In accordance with the Fibre Channel 10-bit Interface specification, the transceiver 30 further comprises high speed serial data outputs capable of interfacing directly to Fibre Channel-type copper cables for electrical transmission or to a fibre optic module for optical transmission in well known fashion.

A receiver section 44 is coupled to a high speed serial data input 46 and further comprises a receiver phase lock loop 48 which locks on to a 1.0625 GHz incoming serial signal and recovers a high speed serial clock and data. Serial data is converted into 10-bit parallel data and the recovered parallel data is provided to the protocol device 32 over the 10-bit wide parallel TTL data receiver bus 36. Byte alignment is established, in well known fashion, by recognizing the 8B/10B, comma character which is defined specifically for synchronization purposes in Fibre Channel-type systems. The comma character is defined as a particular pattern of "ones" and "zeros", comprising "0011111XXX", where the leading zero corresponds to the first bit received. In accordance with the Fibre Channel interface specification, the comma sequence is not contained in any normal 8B/10B coded data character or in any pair of adjacent characters. The comma sequence occurs only within a set of special characters defined as K28.1, K28.5 and K28.7, defined by the specification. A mode signal, MODE, is directed to the transmitter section 38 and receiver section 44 and functions, in a manner to be described in greater detail below, to cause the transceiver 30 to operate in a built-in self-test mode. MODE is an external signal, typically asserted via controller circuitry operating under software or firmware program control, in response to certain predetermined conditions. MODE is typically asserted during integrated circuit manufacturing and is particularly asserted during circuit testing procedures.

Figure 5:
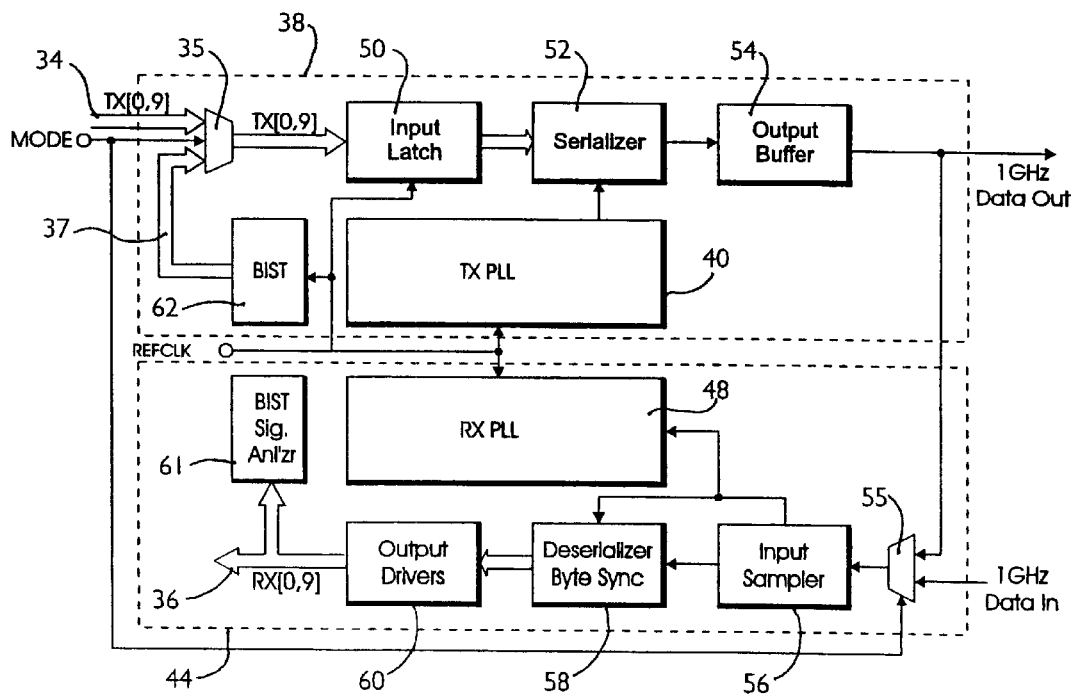
FIG. 5 is a semi-schematic, simplified block diagram of a transceiver circuit configured to transmit and receive 10-bit wide parallel data over a single high-speed data line and including a built in self test circuit in accordance with practice of principles of the present invention.

Turning now to FIG. 5, the functional components of the transceiver 30 of FIG. 4, are depicted in semi-schematic, simplified block diagrammatic form. For ease of illustration, certain elements common to both FIG. 4 and FIG. 5 will be identified by common reference numerals. In FIG. 5, the transmitter section 38 is configured to receive a 10-bit wide transmission character over a parallel transmitter bus 34 (TX[0:9]). The 10-bit wide transmission character is directed through an input MUX 35 which, in a manner to be described in greater detail below, selects the signals on either the transmitter bus 34 or a 10-bit wide self-test data bus 37 for input to the input latch 50 of the transmitter section 38.

Conventionally, once a 10-bit transmission character is latched into the transmitter section 38 through input latch 50, the transmission character is serialized in serializer 52, operating in accordance with a 1.0625 GHz signal provided by the transmitter PLL 40. Once serialized, a 1.0625 GHz serial datastream is directed out of the transmitter section 38 through an output buffer 54 which matches the serial data signal characteristics to the requirements of the Fibre Channel transmission bus.

A receiver section 44 is configured to receive a serial datastream on one input of a receiver MUX 55, the other input of which is coupled to the output of the transmitter section's output buffer 54, and which functions to select either an external 1.0625 GHz datastream or the 1.0625 GHz datastream provided by the output buffer 54, as the source and provide that serial datastream to an input sampler circuit 56 which functions to retime the serial input signal into a synchronous serial bit stream in operative response to a high speed serial clock recovered from the serial input signal by a receiver PLL and clock recovery circuit 48. Synchronized serial data is then directed to a deserializer and byte sync circuit 58 which restores 10-bit parallel data transmission characters from the high speed serial bit stream. In conventional fashion, the deserializer and byte sync circuit 58 further recovers 253.125 MHz receiver byte clocks (not shown) which are 180° out-of-phase with one another and are ultimately used by follow-on circuitry to clock the 10-bit parallel output data. The deserializer and byte sync circuit 58 further provides for "comma" character recognition and data word alignment by continuously sampling the serial data stream for the presence of the Fibre Channel "comma" character. Detection and recovery of a comma character is used to align, or realign, the receiver byte clock signals in order to properly align and correctly output synchronized characters and subsequent data. Properly aligned, 10-bit parallel recovered transmission characters are provided by an output driver 60 to a 10-bit wide parallel output data bus 36 to a, for example, Fibre Channel protocol circuit (32 of FIG. 1).

In accord with practice of the present invention, aligned, 10-bit parallel recovered transmission characters are further provided to a character signature analysis circuit 61, coupled in parallel to the output data bus. The signature analysis circuit 61 operates, in a manner to be described in greater detail below, to qualify a 10-bit test pattern against a data mask and to provide a logical qualification signal that informs a sensing device (a test apparatus or a processor) of the results of the comparison. The signal may have a first logical state if the test pattern matches the data mask pattern, and an opposite logical state if the test pattern is different.

A pseudo-random built-in self-test pattern generator circuit 62 is coupled to provide a 10-bit parallel data word to the second input of the transmitter input MUX 35, as an alternative to a 10-bit transmission character provided on the transmitter bus 34. The built-in self-test (BIST) circuit is coupled to the MUX 35 by a 10-bit parallel data bus 37 and provides 10-bit parallel data to the MUX 35 in operative response to REFCLK, such that the BIST 62 provides 10-bit parallel data to the MUX 35 at a frequency of 106.25 MHz, in similar fashion to the frequency of the transmitter bus 34.

Selection of either the BIST bus 37 or the transmitter bus 34 by MUX 35 is determined by the MODE signal. When MODE is asserted, MUX 35 selects the BIST bus 37 for input and processes the 10-bit parallel data provided thereon in conventional fashion.

When MODE is asserted, it also conditions the receiver MUX 55 to receive one GHz serial data from the transceiver's output buffer rather than from an external serial data bus. In this fashion, BIST 62 outputs a sequence of 10-bit parallel data at a 106.25 MHz rate, which is serialized into a 1.0625 GHz datastream by the transmitter section 38. This 1.0625 GHz serial datastream is directed to the input of the receiver section 44, whence it is deserialized and provided as 10-bit parallel data to the signature analyzer 61, over the receiver data bus 36.

This process continues until the BIST circuit 62 has run through all 255 of its patterns, in a manner to be described in greater detail below. Once the BIST circuit 62 has completed its cyclic pattern generation, the final pattern provided on the receiver bus 36 is evaluated by the signature analyzer 61 against a data mask pattern which is identical to the final pattern generated by the BIST circuit 62. If the patterns match, i.e., if all the bits are in their proper position, the transceiver circuit 30 is deemed to be stable and operable at the required 1.0625 GHz frequency. The signature analyzer 61 asserts the qualification signal in response to a match. The qualification signal might be directed to a dedicated test pin which is accessed by a piece of test apparatus, or, alternatively, it might be sensed by a processing core which, in turn, issues an appropriate signal to the tester.

Thus, it will be understood by those having skill in the art that each particular transceiver circuit 30 is functionally tested with regard to operation and speed (1.0625 GHz), by exercising each transceiver circuit under operating conditions.

In addition to being functionally tested at speed, each transceiver circuit 30 is fully exercised by having a built-in self-test circuit provide 10-bit parallel data for processing, where the 10-bit parallel data conforms to the requirements of the 8B/10B transmission code.

Figures 6, 7:
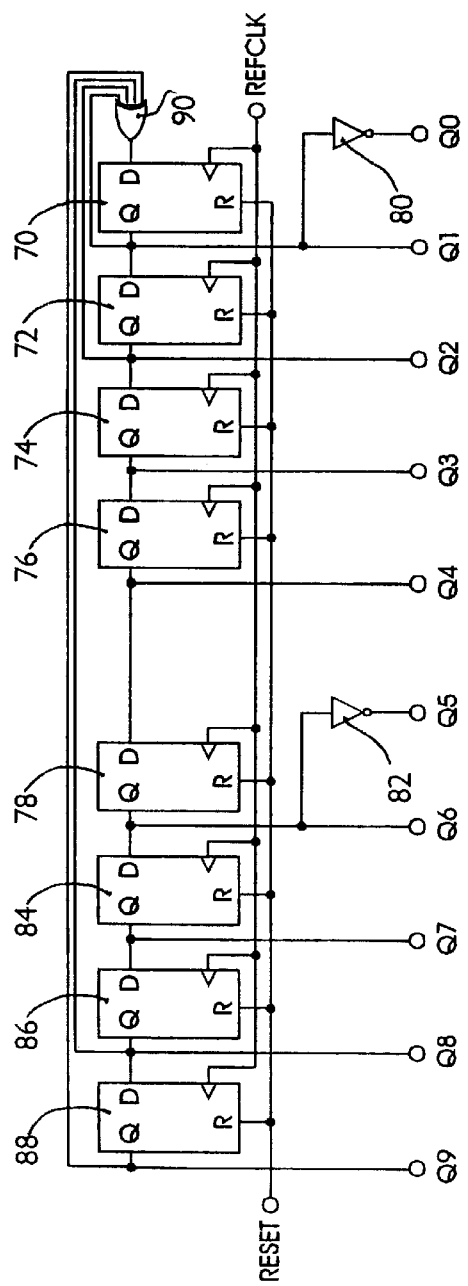
FIG. 6 is a semi-schematic, simplified block diagram of a self test pattern generator operative in accordance with practice of principles of the present invention.
FIG. 7 is a table depicting the patterns generated by the linear feedback shift register comprising the built in self test pattern generator of FIG. 6.

A pseudo-random built-in self-test pattern generator, in accordance with practice of principles of the invention, which accomplishes the objects mentioned above, is depicted in simplified, semi-schematic form in FIG. 6. The built-in self-test pattern generator 62 suitably comprises a linear feedback shift register (LFSR), configured in a recirculating feedback loop. The linear feedback shift register comprises 8 sequential D-flip flops, each having a D input, a Q output, a clock (REFCLK) input and a set (SET) input. However, the 8 sequential D-flip flops are configured to output 10-bit parallel data by capturing and inverting the zeroth bit and the fourth bit in order to create two additional bits, thereby comprising 10. Capturing and inverting the zeroth bit and fourth bit also ensures that the 8B/10B transmission code protocol will be followed, i.e., no more than five sequential ones or five sequential zeros will be generated, either within a pattern or at pattern boundaries.

All of the clock inputs are tied to REFCLK, which is defined as a 106.25 MHz clock signal and, thus, has a frequency equal to the operational speed of the input latch (50 of FIG. 5) of the transceiver chip. Each of the Q outputs of each of the D-flip flops are taken off to define a conventional 8-bit wide bus, with the Q output of the first D-flip flop 70 of the register being directed through an inverter 80 in order to define the least significant bit (LSB) Q0, and further defining the next-most significant bit Q1 directly. The next-most significant bit Q2 is defined by the Q output of the next D-flip flop 72 of the register. The third bit, Q3, is defined by the Q output of the third D-flip flop of the register 74. In like fashion, the fourth bit Q4 is defined by the Q output of the fourth sequential D-flip flop 76 of the register.

The next, or fifth D-flip flop 78 of the register defines the fifth and sixth bits at its Q output, the Q output of D-flip flop 78 being inverted by an inverter 82 in order to define the fifth bit Q5 and defining the sixth bit Q6 directly, in a fashion similar to the LSB, Q0 and the first bit, Q1, through the first D-flip flop 70. The seventh bit, Q7, is define by the Q output of the sixth D-flip flop 84, the eight bit, Q8, is defined by the Q output of the seventh D-flip flop 86, and the most significant bit (MSB) Q, is defined by the Q output of the final D-flip flop of the register 88.

In addition to defining the LSB, Q0, and first bit, Q1, the Q output of the first D-flip flop 70 is further directed to a four input EXOR gate 90. The remaining three inputs of the EXOR gate 90 are developed from the Q outputs of the second D-flip flop 72, the seventh D-flip flop 86 and MSB (or eight) D- flip flop 88. The output of EXOR gate 90 is directed to the D input of the LSB D-flip flop 70 in order to complete the recirculation loop of the linear feedback shift register.

In operation, the linear feedback shift gegister (LFSR) in accordance with the present invention is initialized, such that each of the Q outputs of the D-flip flops comprising the LFSR are set to a "one"by asserting the SET signal. It will be evident to one having skill in the art, that the 10-bit output pattern of the LFSR will not comprise 10 sequential "one"because of the action of the two invertors 80 and 82 which define the LSB, Q0 and the fifth bit Q5. Once the LFSR is initialized, the 10-bit output pattern will be "1111011110", from MSB to LSB.

Following initialization, the LFSR will generate a sequence of 10-bit patterns, with the pattern changing at every assertion edge of the REFCLK signal, as illustrated in the exemplary, partial BIST pattern table of FIG. 7. In the table of FIG. 7, it will be seen that at initialization, CLK., the BIST pattern comprises all "1s" with the exception of bit 0 and bit 5, which have been inverted to "0s" by the respective invertors 80 and 82. It will be understood by those having skill in the art that the four inputs comprising the four input exclusive OR gate 90 are all "1s" and, thus, the output of EXOR gate 90 and, thus, the D input to the first D-flip flop 70, is "0". At the first clock assertion edge, CLK., the zero output of EXOR gate 90 is propagated to the Q output of the D-flip flop 70. The inverter 72 causes the LSB to invert to a 1, while the next bit is 0. The remaining bits up to the MSB remain unchanged from the initialization state at CLK. The LFSR continues to operate in response to the REFCLK signal, as illustrated in the BIST pattern table of FIG. 7, such that an internally non-repetitive pattern of 255 combinations of "1s" and "0s" are developed by the EXOR gate 90 in combination with the D-flip flops. The invertors 80 and 82, in combination with EXOR gate 90, ensures that the number of sequential 1s and 0s are restricted to a maximum of 5.

Thus, it will be seen that the LFSR in accordance with the present invention, is able to generate at least 255 out of 256 patterns representing valid transmission characters in accordance with 8B/10B encoding principles. Since the LSFR is toggled in accordance with REFCLK, it is able to output 10-bit parallel data at a clock rate directly analogous to the rate at which parallel transmission characters are provided on the parallel transmission bus (34 of FIG. 5). Thus, the BIST patterns may be processed as though they were conventional transmission characters and may be accordingly serialized into a 1.0625 GHz datastream which is then re-directed to the receiver input, for deserialization and byte synchronization. This deserialized and byte synchronized data is then compared with the BIST history, in order to determine a match. If the 255 th deserialized byte matches the character pattern of the final BIST pattern history, i.e., "0111011110", it is presumed that the circuit is able to correctly serialize 106.25 MHz parallel data into a 1.0625 GHz serial datastream and that the circuit is further able to deserialize a 1.0625 GHz serial datastream and synchronize the deserialized data into 106.25 MHz parallel data suitable for transmission to a, for example, Fibre Channel protocol controller.

A Fibre Channel transceiver circuit has been described that includes a pseudo-random built-in self-test pattern generator which is capable of dynamically testing operation of the transceiver circuit operating at 1.0625 GHz data rates. The pattern generator comprises a linear feedback shift register, configured to develop 10-bit parallel data which conforms to the requirements of the 8B/10B transmission coding protocol. The pattern generation circuit develops 10-bit parallel data with an 8-element D-flip flop based shift register, with specific register positions being doubled, and with one of the doubled outputs being inverted, so as to ensure that there are no more than five sequential 1s and 0s in the serial datastream.

Thus, There has been brought to the art of high-speed transceiver circuits an improved system and method for dynamically testing such circuits at speed, and with an appropriate, violation free, serial datastream. It will be recognized by those skilled in the art that various modifications may be made to the preferred and other embodiments of the invention described above, without departing from the broad inventive scope thereof. It will be understood, therefore, that the invention is not limited to the particular embodiments, arrangements or steps disclosed. It is rather intended to cover any changes, adaptations or modifications which are within the scope and spirit of the invention as defined by the appended claims.

What is claimed is:

1. A transceiver circuit of the type adapted to interface between highspeed serial data signals at a 1.06 GHz data rate, and 10-bit parallel encoded transmission character bytes, the transceiver circuit comprising:

a transmitter section for encoding a 10-bit parallel encoded transmission character byte to a serial datastream, the transmitter section having a 10-bit wide parallel input and a serial output;

a receiver section for converting a serial datastream into a 10-bit parallel encoded transmission character byte, the receiver section having a serial input and a 10-bit parallel output;

a multiplexer, connected to receive a 10-bit wide transmission character at a first input, the multiplexer connected to output 10-bit wide parallel data to the transmitter parallel input;

a pattern generator, configured to generate 10-bit wide parallel data patterns in accordance with an 8B/10B transmission protocol sequence, the pattern generator comprising a linear array of eight series-connected sequential D-flip flops, each flip flop including a Q output, wherein each Q output of the linear array of D-flip flops defines a particular bit of a 10-bit wide parallel data word, the Q outputs of the first and fifth D-flip flops defining 2-bits, respectively, of the 10-bit wide parallel data word the pattern generator providing said parallel data to a second input of the multiplexer, the multiplexer operatively responsive to a mode signal to select either 10-bit wide transmission character data or 10-bit wide data patterns for outputting to the transmitter parallel input; and a signature analyzer connected in parallel fashion to the parallel data output of the receiver section, wherein the transmitter section serial output is coupled in feed-back fashion to the receiver section serial input, the multiplexer selecting 10-bit wide data patterns from the pattern generator for outputting to the transmitter parallel input in response to the mode signal being in an asserted condition, the transmitter serializing and transmitting the data patterns to the receiver at a characteristic operation frequency, the receiver section receiving and deserializing said data patterns into 10-bit wide parallel data, the signature analyzer sampling the 10-bit wide data patterns and returning a positive match indication signal if the last received 10-bit wide data pattern matches the last transmitted 10-bit wide data pattern generated by the pattern generator.

2. The transceiver circuit according to claim 1, further comprising a reference clock signal having a fixed, uniform frequency, the reference clock signal continuously operative at said frequency, the transmitter section operatively responsive to said reference clock signal to serialize 10-bit wide parallel data into a 1.06 GHz serial datastream.

3. The transceiver circuit according to claim 2, the receiver section further comprising a receiver phase lock loop operatively responsive to the reference clock signal to thereby develop an output timing signal having a frequency an integral multiple of said reference clock signal frequency, the receiver phase lock loop operatively responsive to a phase edge of an incoming serial datastream the datastream having a characteristic frequency substantially equal to the frequency of the receiver phase lock loop timing signal, the receiver phase lock loop deserializing and byte synching the incoming serial datastream to thereby define 10-bit wide parallel data.

4. The transceiver circuit according to claim 3, the pattern generator further comprising:

an input connected to said reference clock signal; and a linear feedback shift register, configured as a recirculating feedback loop.

5. The transceiver circuit according to claim 4, the linear feedback shift register comprising:

a linear array of 8, series-connected sequential D-flip flops, each D-flip flop having a D input, a reset input, a Q output and a clock input, each clock input connected and operatively responsive to said reference clock signal; and a four input EXOR gate, the EXOR gate having an output coupled to the D input of the first sequential D-flip flop of the array, the inputs of the EXOR gate being taken from the Q outputs of the first, second, seventh and eighth D-flip flops of the of the array.

6. The transceiver circuit according to claim 5, wherein the 2-bits defined by the Q output of the first D-flip flop of the array have opposite logical states, and wherein the 2-bits defined by the Q output of the fifth D-flip flop of the array likewise have opposite logical states.

7. The transceiver circuit according to claim 6, wherein the Q-output of the first D-flip flop of the array directly defines the second bit of the 10-bit wide parallel data word, the first bit being defined by inverting the second bit.

8. The transceiver circuit according to claim 7, wherein the Q output of the fifth D-flip flop of the array directly defines the seventh bit of the 10-bit wide parallel data word, the sixth bit being defined by inverting the seventh bit.

9. The transceiver circuit according to claim 8, wherein the linear feedback shift register is initially reset and subsequently operatively responsive to the reference clock signal, the linear feedback shift register shifting data through the D-flip flops, the EXOR gate and inverter elements in combination conditioning the 10-bit parallel data output from the register, such that the 10-bit parallel data defines sequential patterns of 1s and 0s with no single pattern comprising more than five sequential 1s or five sequential 0s.

10. The transceiver circuit according to claim 9, wherein no more than five sequential 1s or five sequential 0s are generated within sequential patterns.

11. A pseudo-random built in self test pattern generator of the type adapted to provide 10-bit wide pattern data to a Fibre Channel-type transceiver circuit, the transceiver circuit operating at a characteristic frequency of about 1.06 GHz, the pattern generator comprising:

an input connected to a reference clock signal, the clock signal having a fixed, uniform frequency, the reference clock signal continuously operative at said frequency; and a linear feedback shift register, configured as a recirculating feedback loop, the linear feedback shift register configured to generate 10-bit wide parallel data patterns in accordance with an 8B/10B transmission protocol sequence, the linear feedback shift register comprising a linear array of eight series-connected sequential D-flip flops, each flip flop including a Q output, wherein each Q output of the linear array of D-flip flops defines a particular bit of a 10-bit wide parallel data word, the Q outputs of the first and fifth D-flip flops defining 2-bits, respectively, of the 10-bit wide parallel data word.

12. The pattern generator according to claim 11, the linear feedback shift register comprising:

a linear array of 8, series-connected sequential D-flip flops, each D-flip flop having a D input, a reset input, a Q output and a clock input, each clock input connected and operatively responsive to said reference clock signal; and a four input EXOR gate, the EXOR gate having an output coupled to the D input of the first sequential D-flip flop of the array, the inputs of the EXOR gate being taken from the Q outputs of the first, second, seventh and eighth D-flip flops of the of the array.

13. The pattern generator according to claim 12, wherein the 2-bits defined by the Q output of the first D-flip flop of the array have opposite logical states, and wherein the 2-bits defined by the Q output of the fifth D-flip flop of the array likewise have opposite logical states.

14. The pattern generator according to claim 13, wherein the Q-output of the first D-flip flop of the array directly defines the second bit of the 10-bit wide parallel data word, the first bit being defined by inverting the second bit.

15. The pattern generator according to claim 14, wherein the Q output of the fifth D-flip flop of the array directly defines the seventh bit of the 10-bit wide parallel data word, the sixth bit being defined by inverting the seventh bit.

16. The pattern generator according to claim 15, wherein the linear feedback shift register is initially reset and subsequently operatively responsive to the reference clock signal, the linear feedback shift register shifting data through the D-flip flops, the EXOR gate and inverter elements in combination conditioning the 10-bit parallel data output from the register, such that the 10-bit parallel data defines sequential patterns of 1s and 0s with no single pattern comprising more than five sequential 1s or five sequential 0s.

17. The pattern generator according to claim 16, wherein no more than five sequential 1s or five sequential 0s are generated within sequential patterns.

* * * * *